United States Patent
Cho

(10) Patent No.: US 6,206,271 B1
(45) Date of Patent: Mar. 27, 2001

(54) METHOD FOR SEALING A VACUUM DOUBLE WALL CONTAINER MADE OF METAL AND ASSOCIATED SEALED THEREOF

(75) Inventor: Sang-Ku Cho, Incheon-Shi (KR)

(73) Assignee: Sejong Isoli Co., Ltd., Incheon-shi (KR)

( * ) Notice: Subject to any disclaimer, the term of this patent is extended or adjusted under 35 U.S.C. 154(b) by 0 days.

(21) Appl. No.: 09/244,526

(22) Filed: Feb. 4, 1999

(30) Foreign Application Priority Data

Jan. 20, 1999 (KR) .................................................. 99-1662

(51) Int. Cl.[7] ............................ B21D 39/00; B23K 31/02; B23P 19/04
(52) U.S. Cl. ........................... 228/164; 228/174; 29/455.1
(58) Field of Search ............................ 228/164; 29/455.1; 164/416; 429/129

(56) References Cited

U.S. PATENT DOCUMENTS

| | | | |
|---|---|---|---|
| 4,451,966 | * | 6/1984 | Lee .......................................... 29/521 |
| 4,694,864 | * | 9/1987 | Libin ...................................... 138/113 |
| 4,736,789 | * | 4/1988 | Shinopulos et al. .................. 164/416 |
| 5,153,977 | * | 10/1992 | Toida et al. .......................... 29/455.1 |
| 5,538,810 | * | 7/1996 | Kaun ..................................... 429/129 |
| 5,588,197 | * | 12/1996 | Satomi et al. ...................... 29/455.41 |

* cited by examiner

Primary Examiner—Patrick Ryan
Assistant Examiner—Zidia Pittman
(74) Attorney, Agent, or Firm—R. Neil Sudol; Henry D. Coleman; William J. Sapone

(57) ABSTRACT

In a method for sealing a vacuum double wall container made of metal which the vacuum double wall container made of metal having a space portion is formed by joining the inner container and the outer container made of metal at respective mouths, an exhaust hole is pierced on an appropriate position of a frame on a bottom portion of the outer container of the vacuum double wall container made of metal in order to evacuate the space portion, and the exhaust hole is sealed with a brazing material in a vacuum heating furnace, a method for sealing a vacuum double wall container made of metal includes the steps of piercing an exhaust hole projected on an appropriate position of a frame of an outer container for evacuating a space portion, installing a member for inhibiting flow more projecting than the exhaust hole and a guide for covering the exhaust hole at a periphery thereof, mounting a brazing material which is melted at a medium temperature of 630~750° C. on the guide, exhausting air in the space portion when the brazing material is heated in a vacuum heating furnace, sealing an exhaust passage between the guide and the exhaust hole without outflow of the melted brazing material, and fixing the guide outside the exhaust hole, so that it is possible to improve performance of heat insulation of the double wall container greatly in accordance with great improvement in the degree of vacuum thereof.

20 Claims, 2 Drawing Sheets

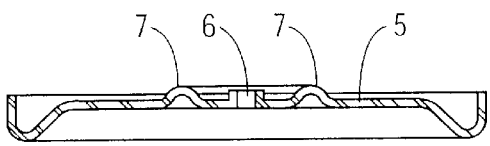
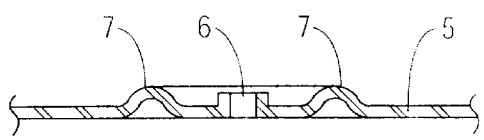
FIG. 2  FIG. 3
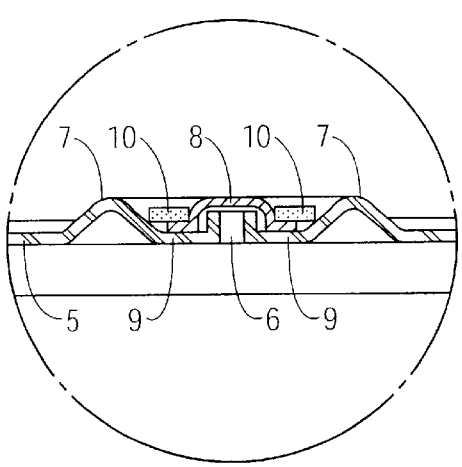
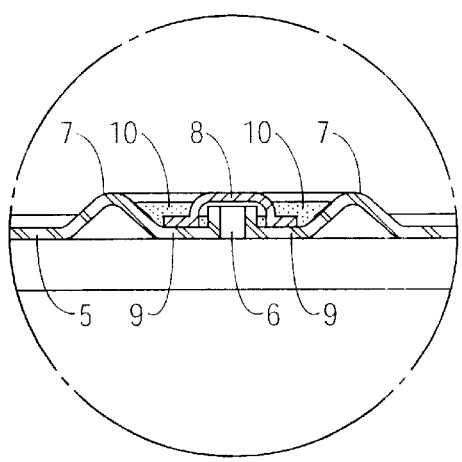
FIG. 4  FIG. 5
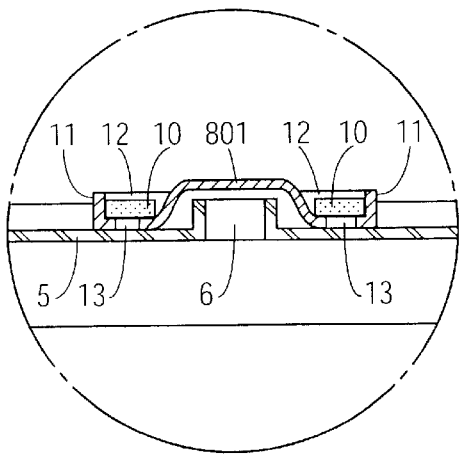
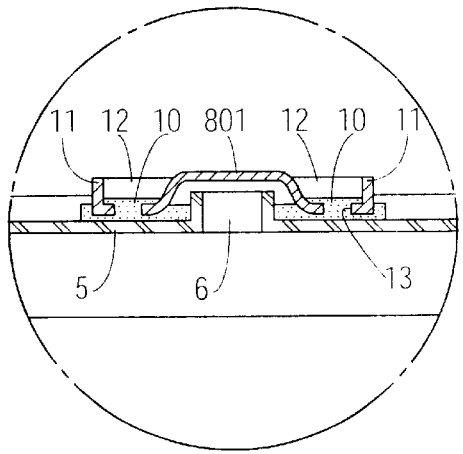
FIG. 6  FIG. 7

METHOD FOR SEALING A VACUUM DOUBLE WALL CONTAINER MADE OF METAL AND ASSOCIATED SEALED THEREOF

BACKGROUND OF THE INVENTION

1. Field of the Invention

The present invention relates to a method for sealing a vacuum double wall container made of metal, and additionally to an associated sealed container construction.

2. Description of the Conventional Art

In general, a double wall container, made of metal isolated thermally, known as a Dewar's bottle or a vacuum container includes an inner container and an outer container defining a space between double walls, and a vacuum portion producing a wall isolated thermally, wherein the vacuum portion exhausts inner air and seals an exhaust portion so that an insulating layer is formed.

A method for manufacturing a vacuum double wall container made of metal as described hereinabove generally includes the steps of forming a double wall container by joining the inner container and the outer container, piercing an exhaust hole on an appropriate position of a bottom face of the outer container, incinerating impurities, such as oil or the like adhered to a peripheral wall of the vacuum double wall container made of metal, in a vacuum heating furnace, evacuating a space formed between the inner container and the outer container, and sealing the exhaust hole. The sealing of the exhaust hole is a very significant factor having an influence upon the degree of vacuum of the double wall container.

A method for sealing the exhaust hole after evacuating the space between the walls of the double wall container has been proposed, which is disclosed in Japanese Laid-open Patent Publication No. 6-169850.

A method for manufacturing a double wall container according to the Laid-open Patent Publication No. 6-169850 includes the steps of joining the inner container and the outer container to produce the interwall space piercing the exhaust hole on the bottom face of the outer container, putting a solid material capable of fusing at a low temperature in the exhaust hole, heating the solid material in a vacuum heating furnace, evacuating the space portion by exhausting air therein, and sealing the exhaust hole by melting the material.

However, the method for sealing the exhaust hole on the vacuum double wall container by melting the material as described hereinabove has problems in that a composition of the material causes a chemical action, which necessarily generates an expansion phenomenon producing gas, which lowers a density of the material melted by loosening a particle structure of the material and deteriorates the degree of vacuum by weakening air tightness.

The method for sealing the exhaust hole as described hereinabove has further problems in that although it has economy of power consumption by a fusion process at the low temperature, the degree of vacuum of the double wall container becomes low, which makes adiabatic efficiency worse and deteriorates heat insulating ability, since the vacuum double wall container made of metal is evacuated at a low degree of vacuum.

Another method for sealing the exhaust hole is disclosed in Japanese Laid-open Utility Publication No. 3-119342, where in joining the inner container and the outer container at respective mouths and making a void portion between the inner container and the outer container a vacuum insulating layer, the method includes the steps of forming a recessed part in the outer container, piercing the exhaust hole for evacuating the void portion in the recessed part, and sealing the exhaust hole by putting a brazing material in the exhaust hole.

However, the method as described hereinabove has problems in that gas remaining in the space portion does not exhaust completely, which produces air bubbles in the brazing material to be fused, which lowers the degree of vacuum of the double wall container and ruptures a sealing portion, since gas is gone and a boiling phenomenon which seals the exhaust hole by fusing it occurs in a blazing process of the brazing material in the vacuum heating furnace.

The method as described hereinabove has further problems in that organic matter, a contaminant, and hazardous gas mixed while the brazing material is blazed, flows into the space portion and greatly deteriorates adiabatic efficiency, since the brazing material is put and melted in the exhaust hole.

SUMMARY OF THE INVENTION

The present invention is derived to resolve the disadvantages of the conventional techniques and it is an object of the present invention to provide a method for sealing a vacuum double wall container made of metal and a sealing construction thereof, in which an exhaust hole is sealed by melting and solidifying a brazing material between an exhaust passage formed between a metallic cap-shaped guide and an outer container and the guide when the guide covers the exhaust hole on the outer container, a mounting portion and a portion for inhibiting flow are formed outside the guide, and the brazing material, such as ceramic materials or the like, is mounted on the mounting portion of the guide in evacuating the double wall container, so that it is possible to enhance the degree of vacuum of the vacuum double wall container and to improve the performance of storage by heat insulation thereof.

In order to achieve the above objects of the present invention, in a method for sealing a vacuum double wall container made of metal having a space portion is formed by joining the inner container and the outer container at respective mouths, an exhaust hole is pierced on a bottom portion of the outer container of the vacuum double wall container in order to evacuate the interwall space, and the exhaust hole is sealed with a brazing material, such as ceramic materials or the like, in a vacuum heating furnace, a method for sealing a vacuum double wall container made of metal includes the steps of piercing an exhaust hole on a frame on a bottom of an outer container, installing a portion for inhibiting flow in order to inhibit a brazing material from flowing outwardly and installing a cap-shaped guide outside the exhaust hole, mounting the brazing material, such as ceramic materials or the like, on the guide, evacuating the space portion by exhausting air in the space portion when the brazing material is heated at a medium temperature in a vacuum heating furnace, sealing the exhaust hole by melting the brazing material mounted on the guide into a stable blazing fire, and fixing the guide on the outer container.

BRIEF DESCRIPTION OF THE DRAWINGS

The present invention will become more fully understood from the detailed description given hereinbelow with reference to the accompanying drawings which are given by way of illustration only, and thus are not limitative of the present invention, and wherein:

FIG. 2 is an excerpted cross-sectional view for showing a construction of a frame on which an exhaust hole is pierced according to an embodiment of the present invention;

FIG. 3 is a cross-sectional view for showing an excerpted exhaust hole portion according to an embodiment of the present invention;

FIG. 4 is a cross-sectional view for showing an installing state of a guide in order to seal an exhaust hole according to an embodiment of the present invention;

FIG. 5 is a cross-sectional view for showing a sealing state of an exhaust hole according to an embodiment of the present invention;

FIG. 6 is a cross-sectional view for showing an installing state of a guide according to another embodiment of the present invention; and FIG. 7 is a cross-sectional view for showing a sealing state of an exhaust hole according to another embodiment of the present invention.

DETAILED DESCRIPTION OF THE INVENTION

Figure 1:
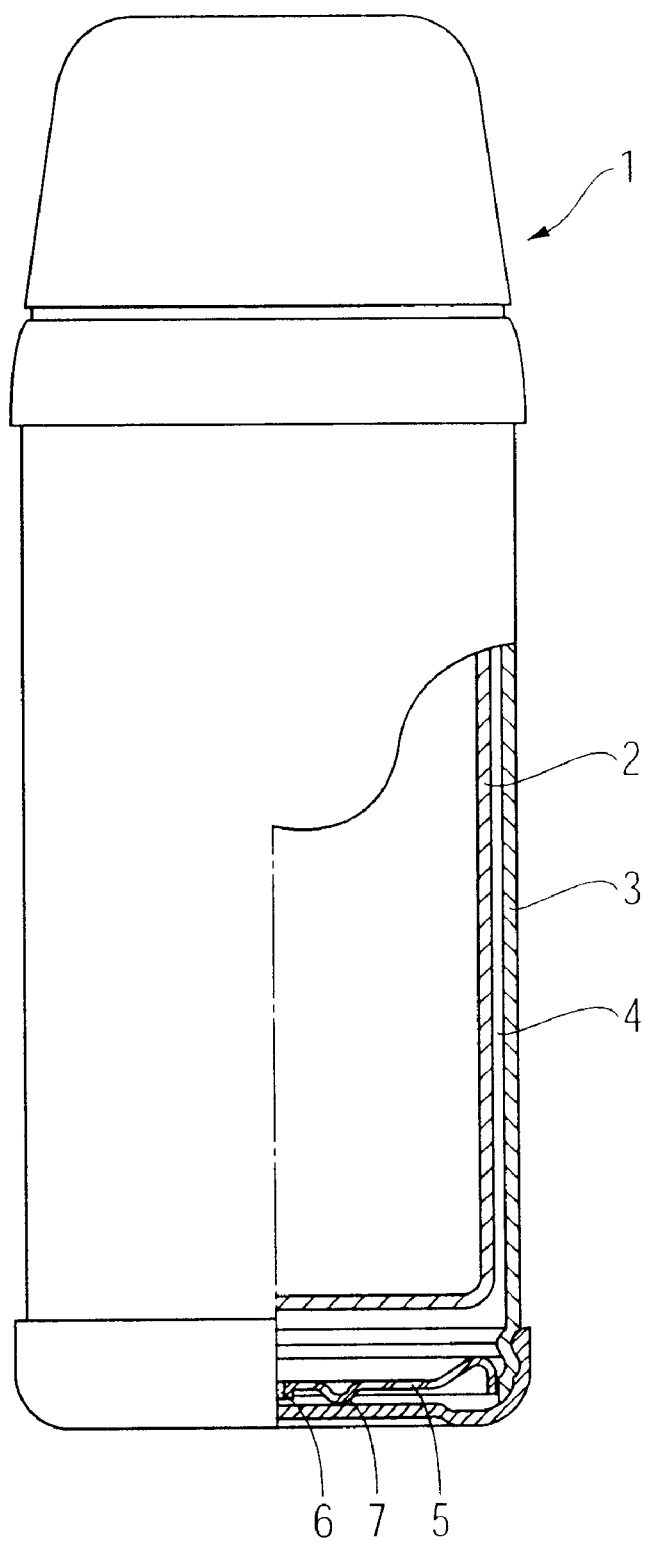
FIG. 1 is an outline view for showing a construction of a vacuum double wall container made of metal according to an embodiment of the present invention.

A method for sealing a vacuum double wall container made of metal and a sealing construction thereof according to preferred embodiments of the present invention will be explained in detail with reference to the hereinbelow accompanying drawings.

FIG. 1 illustrates a cross-sectional view for showing a part of a vacuum double wall container made of metal according to the present invention. The vacuum double wall container 1 includes an inner container 2 and an outer container 3 made of metal, a space portion 4, wherein the space portion 4 becomes a vacuum insulating layer between the inner container 2 and the outer container 3.

FIG. 2 to FIG. 5 illustrate a preceding and a following state which an exhaust hole 6 on a frame 5 on a bottom portion of the outer container of the vacuum double wall container made of metal is sealed by using a brazing material, such as ceramic materials or the like according to an embodiment of the present invention.

In a method for sealing the vacuum double wall container which is formed by joining the inner container 2 and the outer container 3 at respective mouths, the exhaust hole 6 is pierced at an appropriate position on the frame 5 on the bottom portion of the outer container 3 of the vacuum double wall container 1 in order to evacuate the space portion 4, and the exhaust hole 6 is sealed with the brazing material, such as ceramic materials or the like, in a vacuum heating furnace, a sealing construction of the vacuum double wall container metal includes the exhaust hole or port 6 projecting from the appropriate position of the frame 5 of the outer container 3 for evacuating the space portion 4, an annular projection for inhibiting brazing material flow, which projects from the outer container 3 farther than the exhaust hole 6 and which loops about a periphery thereof, a guide 8 which covers the exhaust hole 6 and which is installed in a recess defined by projection 7, an exhaust passage formed between the guide 8 and the frame 5, and the brazing material 10, such as ceramic materials or the like, mounted on a wing part 9 of the guide 8.

When the cap-shaped guide 8 covers the exhaust hole 6 and the brazing material 10, such as ceramic materials or the like, is mounted on the wing part 9 of the guide 8 as described hereinabove, the brazing material is heated in the vacuum heating furnace, air in the space portion 4 being exhausted. After air is exhausted, the brazing material 10 is melted. A part of the melted brazing material 10, flows into the frame 5 along the wing part 9 by capillary action so that the brazing material seals the periphery of the cap-shaped guide 8. The rest of the brazing material 10 which is solidified in the exhaust passage between the wing part 9 of the guide 8 and the frame 5 seals the exhaust hole 6. The exhaust passage is preferably dimensioned not to generate surface tension when the brazing material 10, such as ceramic materials or the like, is introduced into it.

Preferably, the brazing material 10 contains a composition mixing $Bl_2O_2$, $NA_2O_3$, $ZnO$, $Al_2O_3$, $B_2O_3$, $SiO_2$, $V_2O_3$ reasonably and is melted at a medium temperature of 630~750° C. When the brazing material 10 containing the composition is melted at the medium temperature, fusion occurs without production of gas and air bubbles by a chemical reaction.

Although the exhaust hole is more than approximately 3 mm in diameter, it is sealed with the cap-shaped guide 8 smoothly and air in the space portion 4 and a little gas are exhausted promptly and smoothly.

FIG. 6 and FIG. 7 illustrate a cross-sectional view for showing another embodiment of the present invention.

The sealing construction of the vacuum double wall container made of metal according to another embodiment of the present invention includes the exhaust hole 6 projecting from an appropriate position on the frame 5 on the bottom of the outer container 3, a jaw of flange 11 for inhibiting flow of brazing material, the jaw or flange being formed at the periphery of the exhaust hole 6, a mounting portion or wing 12 formed inside the jaw for inhibiting flow, and the brazing material 10 mounted on the mounting portion 12. The sealing construction of FIGS. 6 and 7 includes the cap-shaped guide 801, which is provided in mounting portion or wing 12, with a plurality of holes 13 to function as the exhaust passage.

According to embodiments of the present invention as described hereinabove, when the double wall container 1 is heated in the vacuum heating furnace after covering the periphery of the exhaust hole 6 with the cap-shaped guide 8 and mounting the brazing material 10 (containing the composition mixing $Bl_2O_2$, $NA_2O_3$, $ZnO$, $Al_2O_3$, $B_2O_3$, $SiO_2$, $V_2O_3$ appropriately) between the portion or projection for inhibiting flow 7 and the wing part 9 of the guide 8, the space portion 4 is converted to a vacuum since air in the space portion 4 between the inner container 2 and the outer container 3 of the double wall container 1 is exhausted through the exhaust hole 6. At the same time, the brazing material 10 which is melted at the medium temperature of 630~750° C. seals the guide 8 covering the periphery of the exhaust hole 6 and the frame 5, thus sealing the exhaust hole 6. This results in a favorable and smooth sealing of the exhaust hole 6 since the portion or projection for inhibiting flow 7 and the jaw or projection for inhibiting flow 11 of the guide 801 prevent the melted brazing material 10 from escaping.

According to the present invention, since sealing with the cap-shaped guide is achieved by indirect melting, in which hazardous gas is released completely during a blazing process of the brazing material 10, such as ceramic materials or the like, on the guide 8, 801 and the brazing material 10, such as ceramic materials or the like, seals both the exhaust hole 6 and the exhaust passage 16 in a fairly stable state, it is possible to achieve sealing of good quality as well as to ensure much vacuum period.

EFFECT OF THE INVENTION

As described hereinabove, according to the present invention, since the sealing of the exhaust hole of the vacuum double wall container with the cap-shaped guide is an indirect melting method in which the brazing material, is melted at the medium temperature of 630~750° C., it becomes possible to release gas completely during the blazing process of the brazing material 10, and to seal both the exhaust hole 6 and the exhaust passage 16 in a fairly stable state.

Also, it is possible to improve sealing performance greatly including prevention of air bubbles in the sealing portion due to security of much vacuum period, thereby improving adiabatic efficiency and performance of heat insulation of the double wall container greatly in accordance with great improvement in the degree of vacuum thereof.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A vacuum double wall container comprising:
    an inner container having a first mouth;
    an outer container having a second mouth, said inner container and said outer container being joined to one another at said first mouth and said second mouth, said inner container being smaller than said outer container to define a space between said inner container and said outer container;
    an exhaust port provided on said outer container;
    a projection extending from said outer container about said exhaust port and defining a recess about said exhaust port;
    a guide element covering said exhaust port, said guide element defining an exhaust passage located between said guide element and said outer container, said guide element including a wing portion disposed in said recess; and
    a brazing material disposed in said recess, said brazing material connecting said wing portion of said guide element to said outer container, said exhaust port being sealed by said guide element and said brazing material.

2. The double wall container recited in claim 1 wherein said wing portion is provided with at least one hole, said brazing material extending through said hole.

3. The double wall container recited in claim 2 wherein said projection is an annular flange or jaw extending from said wing portion.

4. The double wall container recited in claim 1 wherein said projection and said recess are substantially annular.

5. The double wall container recited in claim 1 wherein said projection is a deformed portion of a wall or panel of said outer container.

6. The double wall container recited in claim 1 wherein said brazing material extends from an outer surface of said wing portion to a surface of said outer container inside said recess.

7. The double wall container recited in claim 1 wherein said brazing material is a ceramic material.

8. The double wall container recited in claim 1 wherein said wing portion has a periphery, said brazing material sealing said guide element along said periphery to said projection.

9. The double wall container recited in claim 1 wherein said inner container and said outer container are made of metal.

10. The double wall container recited in claim 1 wherein said exhaust port, said projection, said guide element and said brazing material are disposed on a bottom panel of said outer container.

11. The double wall container recited in claim 1 wherein said exhaust port defines an opening or hole greater than 3 mm in diameter.

12. The double wall container recited in claim 1 wherein said exhaust port extends a first distance from said outer container and said projection extends a second distance from said outer container, said second distance being greater then said first distance.

13. A method for manufacturing a vacuum double wall container, comprising:
    providing an inner container having a first mouth and an outer container having a second mouth, said inner container and said outer container being joined to one another at said first mouth and said second mouth, said inner container being smaller than said outer container to define a space between said inner container and said outer container;
    providing, on said outer container, a projection extending from said outer container about said exhaust port and defining a recess about said exhaust port;
    disposing a guide element on said outer container so that said guide element covers said exhaust port and so that a wing portion of said guide element is disposed in said recess;
    placing a brazing material on said guide element;
    after the providing of said projection and the disposing of said guide element, exhausting air from said space through said exhaust port and through an exhaust passage formed between said guide element and said outer container;
    after the exhausting of said air and the placing of said brazing material, heating said brazing material to melt said brazing material and seal said exhaust passage, said projection serving to limit a flow of the melted brazing material; and
    cooling the melted brazing material to thereby fix and seal said guide element to said outer container.

14. The method recited in claim 13, further comprising piercing an exhaust port provided on said outer container prior to the disposing of said guide element.

15. The method recited in claim 13 wherein said guide element and said projection are formed as parts of a single or unitary piece, the providing of said projection and the disposing of said guide element including positioning said single or unitary piece in contact with said outer container.

16. The method recited in claim 13 wherein said projection is provided as an integral portion of said outer container.

17. The method recited in claim 13 wherein the providing of said projection includes deforming a panel of said outer container to form said projection.

18. The method recited in claim 13 wherein said brazing material is heated to a temperature of 630° to 750° C.

19. The method recited in claim 13 wherein said brazing material is a mixture of $Bl_2O_2$, $NA_2O_3$, $ZnO$, $Al_2O_3$, $B_2O_3$, $SiO_2$, and $V_2O_3$.

20. A vacuum double wall container comprising:
    an inner container having a first mouth;
    an outer container having a second mouth, said inner container and said outer container being joined to one another at said first mouth and said second mouth, said inner container being smaller than said outer container to define a space between said inner container and said outer container;

an exhaust port provided on said outer container;

a guide member including (a) a cap portion covering said exhaust port, (b) a projection or flange extending from said outer container about said exhaust port and defining a recess about said exhaust port, and (c) a wing portion disposed in said recess and joining said cap portion to said projection or flange, said guide member defining an exhaust passage located at least in part between said guide member and said outer container, said wing portion being provided with a plurality of holes; and a brazing material disposed in said recess, said brazing material connecting said wing portion of said guide member to said outer container through said holes, said exhaust port being sealed by said guide member and said brazing material.

* * * * *